United States Patent Office 3,391,575
Patented July 9, 1968

3,391,575
COMPENSATED PRESSURE DIFFERENTIAL
MEASURING INSTRUMENT
Wilfred H. Howe, Sharon, and Lyman Cook and Howard W. Nudd, Jr., Foxboro, Mass., assignors to The Foxboro Company, Foxboro, Mass.
Filed Oct. 8, 1965, Ser. No. 494,032
13 Claims. (Cl. 73—206)

ABSTRACT OF THE DISCLOSURE

An instrument for totalizing the flow of gaseous fluids comprising a casing to which is applied a differential pressure corresponding to the fluid flow rate so as to develop a corresponding force on a pivotally-mounted force bar, this force being directed from the force bar as the input to a signal-multiplying mechanism including a balanceable member which also receives a rebalance force transverse to the input force, the balanceable member being pivotally coupled to a reaction element arranged to vary the relationship between the input force and the rebalance force in accordance with the angular positioning of the reaction element, there also being provided means for positioning the reaction element at an angular disposition corresponding to the static pressure of the gaseous fluid to effect a multiplication of the static pressure and the differential pressure, the instrument further including an eccentric rotating member producing the rebalance force so as to introduce a square-law factor in the computation.

---

This invention relates to industrial process instrumentation apparatus used, for example, to measure the value of a process condition. More particularly, this invention relates to such apparatus including means for compensating for other variables, i.e. secondary process conditions, which influence the measurement results. In an embodiment of the invention, described herein, there is provided an instrument for measuring and totalizing the flow of gaseous fluids.

Fluid flow commonly is measured inferentially by inserting an orifice plate (or the equivalent) into the flow stream and sensing the differential pressure developed by the passage of the fluid through the orifice. If it is desired also to integrate the fluid flow over any given period of time, special apparatus preferably is used to take into account the "square-law" relationship between the fluid flow rate and the differential pressure. One particularly successful device including such special apparatus is the liquid flow integrator employing a rotating flyball arrangement shown in U.S. Patent 2,930,231 issued to H. L. Bowditch.

In the instrument described in that patent, a pneumatic pressure signal corresponding to the measured differential-pressure is applied to a balanceable member to which also is applied an opposing force developed by a rotating flyball. This flyball is pivotally supported on a turbine wheel the speed of which is controlled by the balanceable member in such a manner as to maintain the forces on this member in balance. Since the centrifugal force generated by a rotating flyball is proportional to the square of its velocity of rotation, the speed of the turbine wheel will, when the balanceable member is stationary, be directly proportional to the flow rate of the fluid being measured. By connecting the rotating shaft of the turbine wheel to a counter device arranged to indicate the total number of revolutions of this shaft, there is provided a means for measuring the total volume of liquid flow over a given period of time.

For totalizing the flow of gases, as in gas pipe lines and the like, the conventional square-rooting liquid flow integrator ordinarily will not provide accurate results. This is because, due to the compressibility of gas, there generally will be variations in mass flow not represented by the differential pressure drop across the orifice. This limitation in the operation of presently available equipment has presented a problem the solution of which is one object of this invention.

Accordingly, it is a general object of this invention to provide process instrumentation apparatus which is superior to that available heretofore. One specific object of this invention is to provide such apparatus capable of accurately totalizing the mass flow of gas through a pipe line under the conditions typically prevailing with conventional pipe lines. Other specific objects, aspects and advantages of the invention will be in part pointed out in and in part apparent from the following description considered together with the accompanying drawing, in which.

Figure 1:
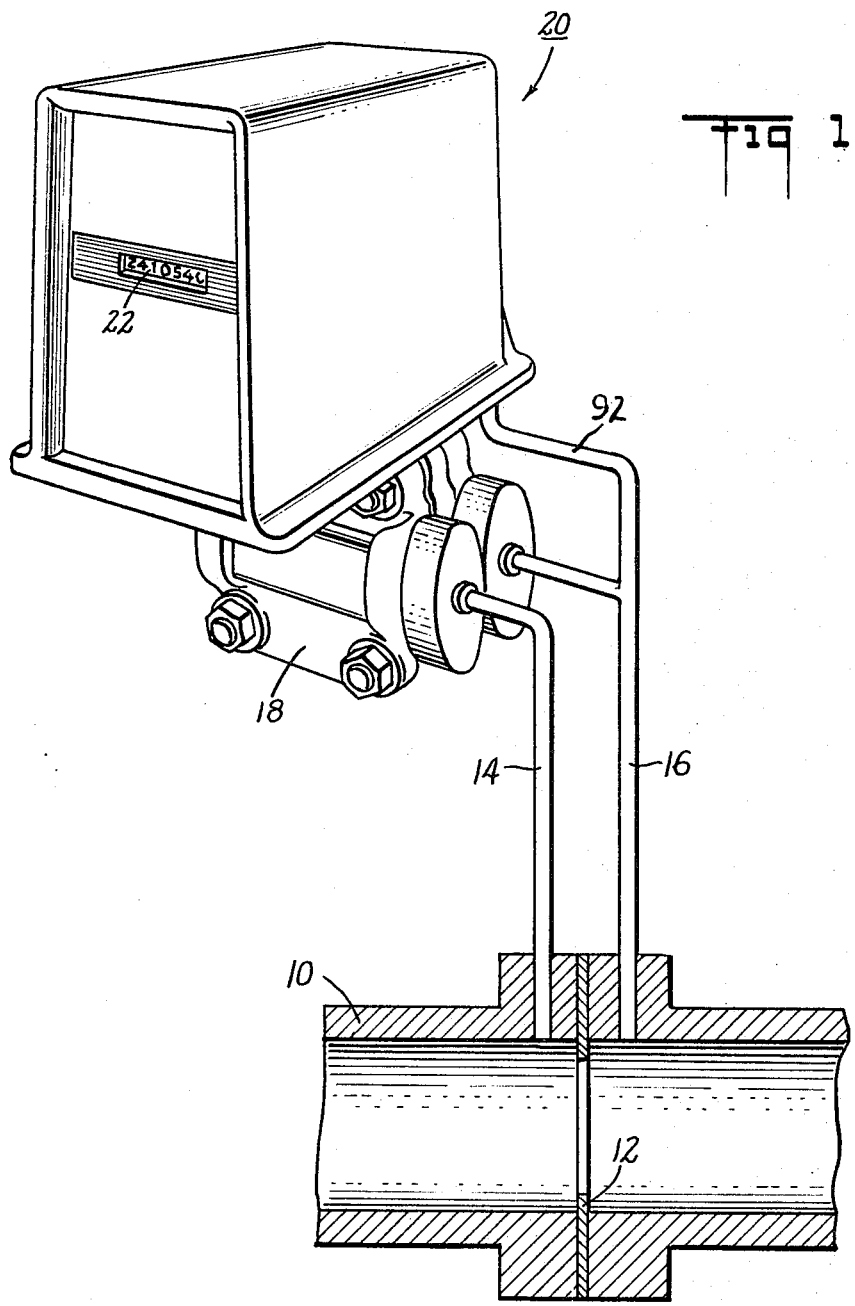
FIGURE 1 is a perspective view of an instrument in accordance with this invention.

Referring now to FIGURE 1, there is shown a conventional flow pipe 10 having an orifice plate 12 with conduits 14 and 16 at opposite sides thereof to transmit the differential pressure across the orifice to the base 18 of an instrument generally indicated at 20. The flow pipe 10 may, for example, be a gas pipe line of the kind commonly used to transmit natural gas over long distances. Ordinarily, the pipe is buried underground so that the temperature of the flowing gas will not be affected significantly by diurnal changes in temperature. The base 18 is mounted immediately adjacent the pipe by conventional means, not shown.

Figure 2:
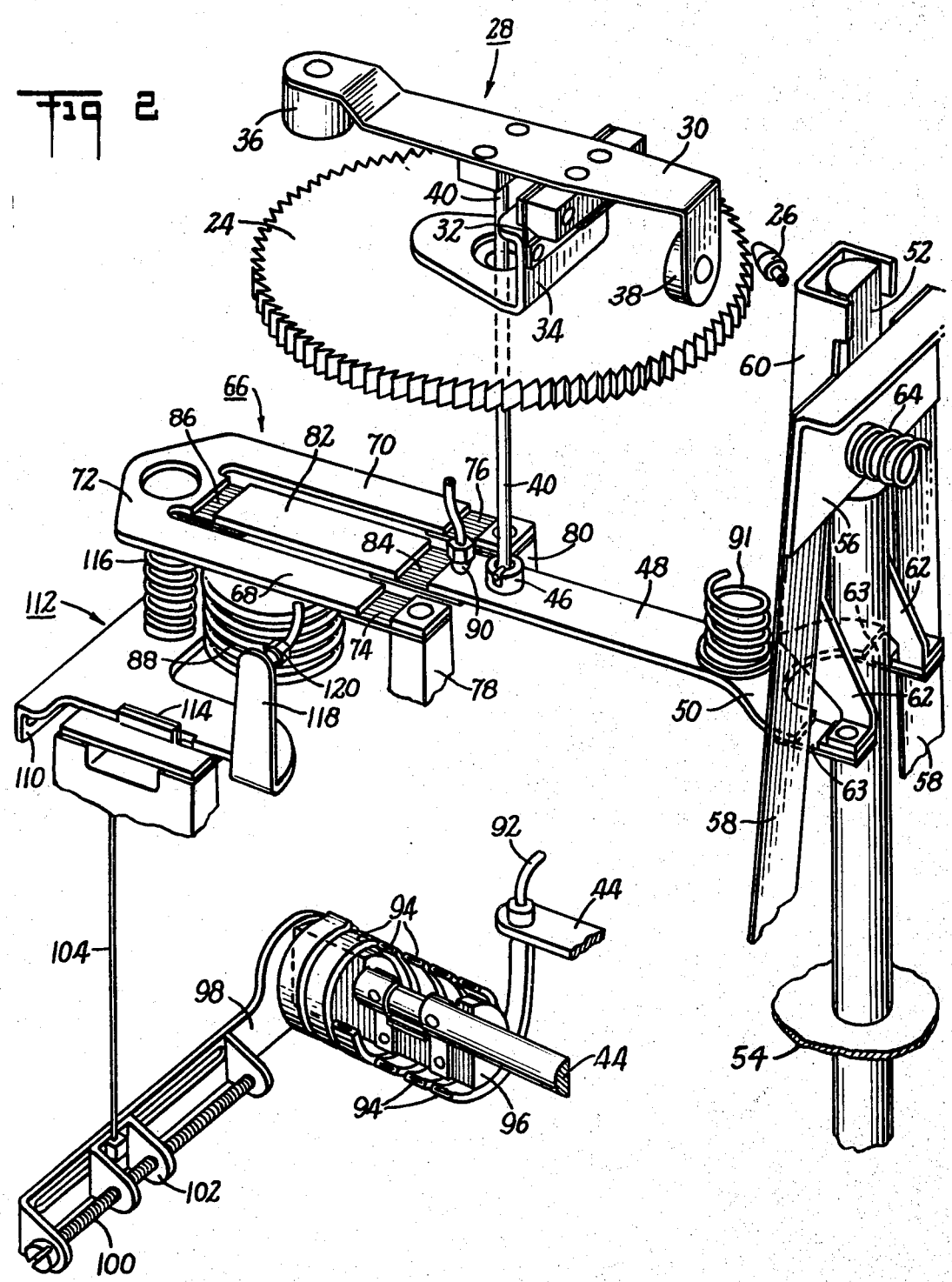
FIGURE 2 is a perspective view of the principal operating parts of the instrument apparatus, shown partially exploded.
Figure 3:
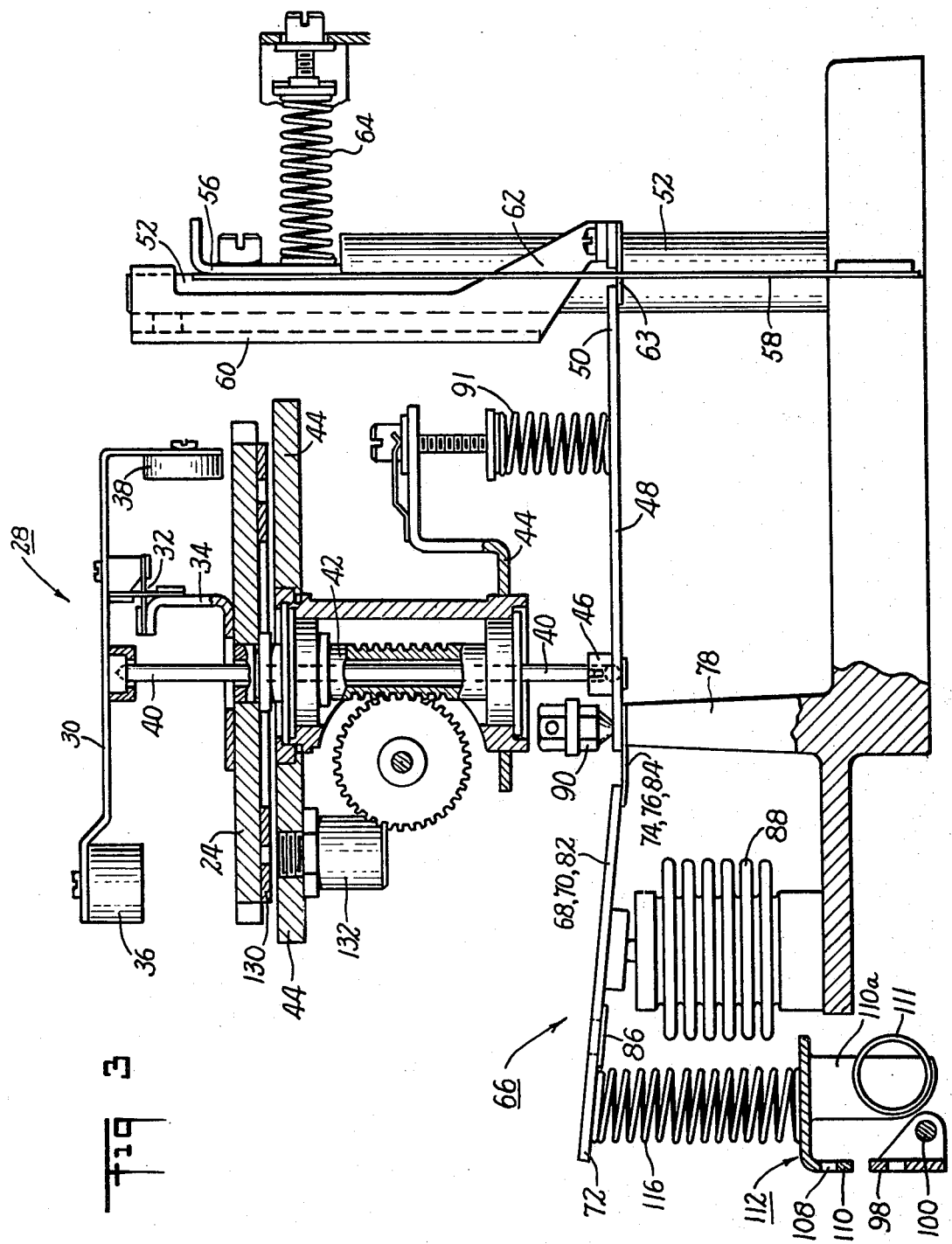
FIGURE 3 is an elevation view, partly in section, of certain components of the apparatus.

On the front panel of the instrument 20 is a six-digit indicating counter 22 which displays a number proportional to the total amount of gas which has passed the pipe 10 over some preceding period of time. This counter is driven through suitable gearing by a pneumatic turbine wheel 24 (see FIGURES 2 and 3) rotated by the gas stream from a throttle nozzle 26. As explained in more detail in the above-identified Patent 2,930,231, the velocity of the gas stream striking the turbine is adjusted by a pneumatic relay (not shown) which is in turn controlled by a feedback signal in a manner to be explained hereinbelow.

The turbine wheel 24 carries a flyball assembly 28 (see also FIGURE 3) comprising a horizontal arm 30 pivotally mounted by cross-flexures 32 to a mounting block 34 secured to the top of the turbine wheel. At the remote ends of the arm 30 are respective flyball weights 36 and 38 which, when the turbine wheel is spinning, produce corresponding centrifugal forces tending to pivot the arm 30 counterclockwise (FIGURE 3) about the cross-flexures 32. The flyball weights 36 and 38 are symmetrically arranged with respect to the rotating axis of the turbine wheel to provide static balance.

The centrifugal force of the flyball weights 36 and 38 applied to arm 30 creates a downwardly directed force along a vertical bearing pin 40 which extends through the center of the turbine shaft 42 and a hole in the frame member 44 to a bearing seat 46 secured to a horizontal balanceable member 48. The right-hand end of member 48 is formed as a yoke 50 the arms of which extend around a vertical force bar 52. The lower end of this bar is acted on by the force developed by a conventional diaphragm chamber in the base 18. This force is proportional to the differential pressure represented by the pressure signals from the conduits 14 and 16, and tends to pivot the force bar 52 clockwise (FIGURE 2) about the usual pressure sealing diaphragm 54. Detailed information on the construction of the diaphragm chamber may be found in various prior patents, such as U.S. Patent No. 2,770,258. These details do not form any part of the present invention.

The upper end of the force bar 52 is cut away to form a vertical flat surface adapted to receive a cross member 56. This member in turn is secured to a pair of vertical flexible strips 58 arranged in the conventional A-shaped configuration (see U.S. Patent 2,806,480), and which are effective to prevent vertical movement of force bar 52 while permitting the slight pivoting motion about the axis defined by sealing diaphragm 54. The upper end of force bar 52 also is secured to a force-transmitting linkage member 60 the lower end of which has two depending legs 62 fastened by flextures 63 to the respective arms of the yoke 50. Member 60 forms part of a known over-range safety arrangement which permits relative movement between the force bar 52 and the yoke 50 in the event that full static pressure is accidently applied to the force bar. For the purpose of this disclosure, however, it can be assumed that member 60 is connected rigidly to force bar 52.

A bias spring 64 urges cross member 56 to the left (FIGURE 2) to overcome the stiffness of a flexure structure, as will be described subsequently, connected to the remote end of member 48. Since force bar 52 tends to rotate clockwise when a differential pressure is applied, it opposes the force of spring 64 and thus reduces the longitudinal force on member 48 by an amount proportional to the differential pressure across the orifice.

The balanceable member 48 is secured to the center arm of a three-element flexure structure generally indicated at 66. This structure is operationally identical with the corresponding device shown in copending application Ser. No. 469,259 filed on July 2, 1965, by Hoel L. Bowditch and Philip H. Sanford, and which includes a detailed description of its design and operation.

In brief, the outer arms 68 and 70 of structure 66 are integral with a common head piece 72 and are connected at their other ends by flexures 74 and 76 to respective supports 78 and 80 integral with the frame. The center arm 82 is connected by one flexure 84 to the balanceable member 48 and by another flexure 86 to the head piece 72. A pneumatic bellows 88 produces an upward force against the outer legs 68 and 70 tending to pivot these legs and the center member 82 about the pivot axis formed by flexures 74, 76 and 84. This pivoting motion, which is shown exaggerated in FIGURE 3, normally has a maximum stroke of about 5° from the horizontal.

Positioned immediately above the balanceable member 48 is a conventional pneumatic detector nozzle 90 which is supplied with gas under pressure through the usual flow restrictor (not shown) so that the nozzle back pressure will vary with slight changes in the positioning of the balanceable member 48 as the latter pivots about the lower ends of legs 62. As is well known, the full range of back pressure variation of such "nozzle-flapper" sensing devices will be obtained with a flapper motion (i.e., vertical movement of member 48) less than .001 inch. This back pressure is directed to the usual pneumatic relay (not shown) the output of which controls the flow of gas through the throttle nozzle 26 thereby to adjust the speed of the turbine wheel 24 at the value which produces a balance of all forces on member 48.

Figure 5:
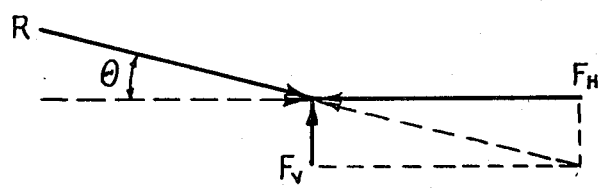
FIGURE 5 is a vector diagram illustrating the balance of forces.

As mentioned hereinabove, the vertical pin 40 applies a downward force against balanceable member 48. This is true even when the turbine 24 is stopped, due to the offset position of the cross-flexures 32 with respect to the flyball weights 36 and 38. Counterbalancing the static downward force applied by pin 40 is an upward force applied to the balanceable member by a tension spring 91 secured to the frame member 44. Referring now to FIGURE 5, when the apparatus is in operation and the forces on member 48 are in balance, the net horizontal force $F_H$ is related to the net vertical force $F_V$ in accordance with the angle $\theta$ of the flexure structure 66 with respect to horizontal. Expressed mathematically, $F_V = F_H \tan \theta$. When so balanced, the vector combination of the forces $F_H$ and $F_V$ is equal and opposite to the net reaction force R developed in the center arm 82 of the flexure structure.

Figure 4:
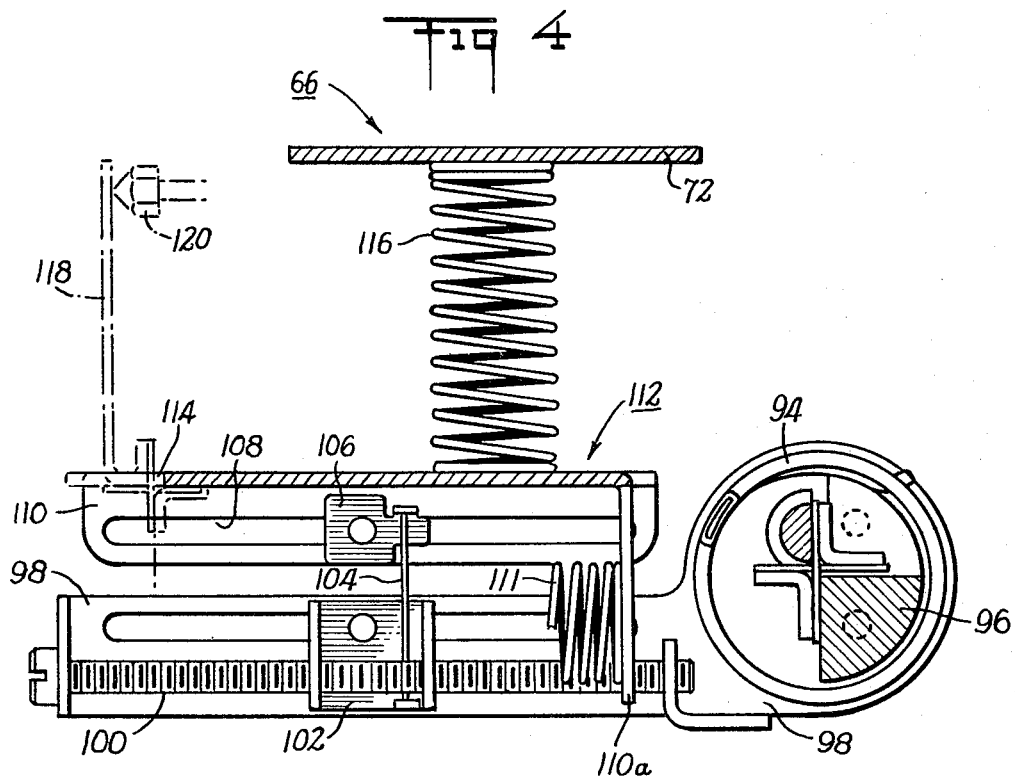
FIGURE 4 is a vertical section showing details of the span adjustment mechanism.

The angle $\theta$ of the flexure structure 66 is controlled by bellows 88 the pressure of which is set by a servo mechanism, to be described, in accordance with the static pressure of the pipeline 10. In more detail, the static pressure is directed through a line 92 to pressure-responsive helical element 94 which is supported interiorly by a flexure secured to a mounting block with a counterweight 96. This support structure permits the free end of the helical to rotate with changes in applied pressure. Secured to this free end is a horizontal arm 98 (FIGURE 2) carrying an adjustment screw 100 mounting a follower 102. Fastened to this follower is a flexible wire 104 which extends vertically up to a part 106 (FIGURE 4) mounted for horizontal movement in a slot 108 in a second arm 110 parallel to arm 98.

This second arm 110 forms part of an L-shaped lever, generally indicated at 112, which is pivotally supported by cross-flexures 114 for slight rotary movement about a horizontal axis at right angles to one end of arm 110. At the other end of arm 110 is a tension spring 116 which extends up to the head piece 72 of flexure structure 66 to apply a downward force thereto in opposition to the upward force of bellows 88.

The rearward end of lever 112 is formed with an upstanding ear 118 which serves as a flapper for a detector nozzle 120 supplied with gas under pressure through the usual line restrictor (not shown). The nozzle also is connected to bellows 88 (by means not shown) so that the bellows receives the nozzle back pressure which varies with slight changes in spacing between the nozzle and the ear 118.

Static pressure applied to helical 94 tends to rotate the arm 98 downwards, thereby developing a force tending to pull the upper arm 110 down about the axis of cross-flexures 114. This tends to move ear 118 closer to nozzle 120, thereby increasing the nozzle back pressure and, correspondingly, the pressure in bellows 88. This moves the flexure structure 66 up about the axis 74, 76, 84, and increases the tension on spring 116. Ultimately, the force of this spring will match the increased force applied through wire 104 to arm 110. Spring 116 is essentially linear in its operation, and thus when the forces are balanced, the deflection of the flexure structure 66 will be proportional to the static pressure of the pipeline 10. Since the angle $\theta$ of the flexure structure is quite small, this angle is essentially proportional to the vertical deflection of the head piece 72, and the tangent of this angle, in turn, is essentially equal to the angle (expressed in radians).

A servo zero spring 111 (FIGURE 3) also is provided to set the initial angle of arm 110. This spring engages a depending tab 110a forming part of arm 110, and tends to rotate arm 110 about cross-flexures 114 in such a direction as to move ear 118 toward nozzle 120, thus aiding the force developed by the helical 94. Spring 111 is adjusted to compensate for the tension of spring 116, which tends to pull the flexure structure 66 down below horizontal position, and also to compensate for atmospheric pressure (normally 14.7 lbs.) by setting the initial position of the flexure structure 66 above horizontal by an angle which depends upon the span of the instrument.

Considering now the overall operation of the instrument, a force $F_{dp}$ corresponding to the differential pressure across the orifice 12 is applied by bar 52 in a horizontal direction to the balanceable member 48. This member is maintained in balance by automatic adjustment of a vertical feedback force $F_{fb}$ applied thereto by force pin 40, and derived from the centrifugal forces generated by the flyball weights 36 and 38. As mentioned hereinabove, the relationship between the horizontal and vertical forces is determined by the angle $\theta$ of the flexure structure 66, which angle in turn is proportional to static line pressure $P_s$ applied to helical 94. In symbolic form, therefore, $F_{fb}=(F_{dp})$ (tan $\theta$). Since tan $\theta=k_1P_s$, then $F_{fb}=(F_{dp})$ $(k_1)$ $(P_s)$. Also, since $F_{fb}$ is proportional to the square of the seed of rotation $S$ of the turbine 24, then $S=\sqrt{K2F_{fb}}$. Substituting, $S=\sqrt{F_{dp}KP_s}$, an expression which also defines masse flow rate of a gas constant temperature and specific gravity. Thus the turbine speed will be proportional to this flow rate, and consequently the numerical representation of the counter 22 on the front face of the instrument will indicate total quantity of gas flow.

The force pin 40 is formed with a conical upper end, and is journaled against lateral movement by a conventional ball bearing race surrounding the cone. The ball bearing housing serves to cover the tip of the force pin to assure that condensate or other foreign liquid material will not flow into the bearing surfaces. At its lower end the force pin is connected to the balanceable member 48 by conventional means, comparable to a universal joint, which permits the force pin to be tipped at a slight angle but prevents its rotation.

The adjustment screw 100 is arranged to permit the follower 102 to be moved longitudinally, and the part 106 on the upper arm 110 is adapted to be shifted correspondingly so as to maintain the wire 104 in a substantially vertical position. By this shifting of the wire laterally, the effective lengths of the arms 98 and 110 are altered so as to change the amount of force applied by spring 116 for a given static pressure input signal. This effect changes the "span" of the instrument to suit the characteristics of the particular gas being measured.

The instrument described herein also is well adapted to provide output indications other than the counter display 22. More particularly, the counter shaft can be provided with means to close a flapper-nozzle, e.g. once every revolution, and thereby produce a corresponding pressure pulse suitable for transmission to a remote location to actuate any conventional indicating or operating device such as a recorder or printer, etc. Electrical pulse readout means also can be provided if desired. For this purpose, annular disc 130, which is mounted for rotation with turbine 24, is provided on its lower surface with a series of small magnetic anomalies, such as holes or magnetic inserts, evenly spaced about the disc. A magnetic pick-up head 132 also is fixed just beneath disc 130 closely adjacent the path of movement of the magnetic anomalies and arranged to produce an electrical pulse each time one passes by. Thus a train of electrical pulses can be developed having a frequency proportional to the gas flow rate and adapted to be transmitted to a remote location to operate any conventional electrical indicating or operating device.

It is to be noted that this invention is not limited to the specific arrangement and purpose disclosed, i.e. apparatus for providing compensation for static pressure. For example, it may be desirable in certain gas flow measuring applications to set the angle of the flexure structure in accordance with density of the flowing gas for the purpose of providing a true measure of mass flow. Still other system uses, and equivalent structural arrangements, will be apparent to those skilled in the art in light of the above disclosure. Accordingly, this disclosure is not intended to restrict the scope of the present invention but to illustrate the invention so that those skilled in the art may apply it in various ways to suit different requirements and conditions.

We claim:
1. A process measuring instrument adapted to be field-mounted adjacent a gas flow pipe and to produce an indication corresponding to the flow rate of the gas, while automatically compensating that indication for changes in the value of a secondary condition such as static pressure in the pipe line, said instrument comprising: a support structure adapted to be mounted adjacent the process; first sensing means mounted on said support structure and connected to the pipe line to respond to variations in the flow rate of the gas, said first sensing means including means to produce a first force corresponding to said flow rate; second sensing means mounted on said support structure to respond to variations in said secondary condition, said second sensing means including means to produce a second force corresponding to said secondary condition; a signal multiplying mechanism mounted on said support structure and having means to receive two input signals in the form of variable forces, said mechanism including a balanceable member and means connecting said balanceable member to said receiving means to produce changes in the state of balance of said balanceable member corresponding to changes in either said first or second forces; unbalance detecting means operatively associated with said balanceable member to create a control signal the changes in magnitude of which reflect changes in the state of balance of said balanceable member; rotating means actuated by said control signal and operable to develop a corresponding centrifugal force, means coupled to said rotating means to apply to said balanceable member a rebalance force corresponding to said centrifugal force, said rebalance force maintaining said balanceable member essentially stationary whereby said control signal varies with said flow rate and also varies with changes in said secondary condition; and output means actuated by said rotating means to develop an output based on the speed of said rotating means indicating the value of said flow rate compensated for changes in said secondary condition.

2. A gas flow measuring instrument adapted to be field-mounted and to produce a measurement equivalent to mass flow of the gas over a period of time, comprising: a support structure adapted to be mounted adjacent a gas pipe; first sensing means mounted on said support structure and connected to the pipe to respond to variations of the differential pressure across a flow restriction therein, said first sensing means including means to produce a first force corresponding to said differential pressure; second sensing means mounted on said support structure and connected to said pipe to respond to variations of a secondary condition of the gas such as static pressure, said second sensing means including means to produce a second force corresponding to said secondary condition; a signal multiplying mechanism mounted on said support structure and having means to receive two input signals in the form of variable forces, said mechanism including a balanceable member and means connecting said balanceable member to said receiving means to produce changes in the state of balance of said balanceable member corresponding to changes in either said first or second forces; unbalance detecting means connected to said support structure and operatively associated with said balanceable member to create a control signal the changes in magnitude of which reflect changes in the state of balance of said balanceable member; force-producing means actuated by said control signal and operable to develop and apply to said balanceable member a rebalance force proportional to the square of a variable characteristic of said force-producing means, said rebalance force maintaining said balanceable member essentially stationary whereby said variable characteristic changes with said differential pressure and also said secondary condition; and output time-integrating means responsive to said variable characteristic to develop an output indication reflecting the amount of gas flowing through said pipe over a period of time.

3. Measuring apparatus for totalizing the amount of a gas passing through a flow pipe comprising: first sensing means connected to the pipe to respond to variations of differential pressure across an orifice therein, said first sensing means including means to produce a first force corresponding to said differential pressure; second sensing means connected to said pipe to respond to variations of the static pressure therein, said second sensing means including means to produce a second force corresponding to said static pressure; a signal multiplying mechanism mounted on said support structure and having means to receive two input signals in the form of variable forces, said mechanism including a balanceable member and means connecting said balanceable member to said receiving means to produce changes in the state of balance of said balanceable member corresponding to changes in either said first or second forces; unbalance detecting means operatively associated with said balanceable member to create a control signal the changes in magnitude of which reflect changes in the state of balance of said balanceable member; rotatable centrifugal force-producing means actuated by said control signal and operable to develop and apply to said balanceable member a rebalance force proportional to the square of its speed of rotation, said rebalance force maintaining said balanceable member essentially stationary whereby said speed of rotation varies with said differential pressure and also varies with said static pressure; and output means actuated by said force-producing means to develop an output indication reflecting the total number of revolutions thereof.

4. Apparatus as in claim 3, wherein said signal multiplying mechanism includes an angularly-shiftable element pivotally connected to said balanceable member to control the response thereof to changes in applied force; and means coupling said element to one of said sensing means to position said element to an angle corresponding to the respective force.

5. Apparatus as in claim 4, wherein said coupling means comprises a servo-mechanism including a second balanceable member to which the force developed by said one sensing means is applied, an unbalance detecting means associated with said second balanceable member to produce a second control signal responsive to changes in the balance of force therein, resilient means connecting said angularly-shiftable element to said second balanceable member to apply thereto a force proportional to the angle and in opposition to the force of said one sensing means, and a second rebalance force producing means responsive to said second control signal to apply to said angularly-shiftable element a force causing said element to take a position maintaining the forces on said second balanceable member in balance, whereby the angle of said element is maintained proportional to said force produced by said one sensing means.

6. Apparatus as in claim 5, wherein said second sensing means is responsive to static pressure in the flow pipe, said second sensing means further including adjustment means to alter the magnitude of force applied to said second balanceable member for a given static pressure, thereby to change the span of the instrument.

7. A field-mounted differential-pressure flow measuring instrument comprising a casing having first and second conduit means coupling the interior of the casing to respective regions of a flowing fluid stream between which exists a differential pressure proportional to flow rate; a force-transmitting mechanism having a part thereof extending into said casing to receive an input force proportional to said differential pressure, said force-transmitting mechanism having a second part external of said casing serving as a force balanceable member; rebalance force-producing means coupled to said balanceable member to apply thereto a rebalance force in a direction transverse to the direction of said input force;

a force-controlling structure comprising a reaction element, first coupling means defining a first pivot axis and connecting said reaction element to said balanceable member to control the movements of said balanceable member in response to any change of said input force thereon, a support element for said reaction element; second coupling means connecting said support element to said reaction element; third coupling means mounting said support element for pivotal movement about a pivot axis at least approximately aligned with said first pivot axis; adjustment means for rotating said support element about said pivot axis so as to vary the direction of movement of said balanceable member in response to any unbalance in forces applied thereto; and detector means coupled to said balanceable member to develop for said rebalance force-producing means a control signal responsive to said movement of said balanceable member, said control signal being operative to set the rebalance force so as to maintain the total forces thereon in balance.

8. Apparatus as claimed in claim 7, wherein said first, second and third coupling means comprise flexure means providing essentially frictionless pivots.

9. Apparatus as claimed in claim 8, wherein said force-transmitting mechanism comprises an elongate force-bar extending into said casing, said rebalanceable member comprising an element extending transversely with respect to said force-bar receive to input force therefrom.

10. Apparatus as claimed in claim 9, including fourth flexure means coupling said balanceable member to said force-bar to accommodate slight movement of the remote end of said balanceable member in a direction transverse to the axis of said balanceable member; and said detector means comprises pneumatic nozzle means mounted adjacent one side of said balanceable member to produce a control signal responsive to the positioning of said balanceable member about said fourth flexure means.

11. Apparatus as claimed in claim 7, wherein said adjustment means comprises means responsive to static pressure of the flowing fluid to adjust the positioning of said reaction element in corresponding to the static pressure.

12. A gas flow measuring instrument adapted to be field-mounted and to produce a measurement equivalent to mass flow of the gas over a period of time, comprising: a support structure adapted to be mounted adjacent a gas pipe; first sensing means mounted on said support structure and connected to the pipe to respond to variations of the differential pressure across a flow restriction therein, said first sensing means including means to produce a first force corresponding to said differential pressure; second sensing means mounted on said support structure and connected to said pipe to respond to variations of a secondary condition of the gas such as static pressure, said second sensing means including means to produce a second force corresponding to said secondary condition; a signal multiplying mechanism mounted on said support structure and having means to receive two input signals in the form of variable forces, said mechanism including a balanceable member and means connecting said balanceable member to said receiving means to produce changes in the state of balance of said balanceable member corresponding to changes in either said first or second forces; unbalance detecting means connected to said support structure and operatively associated with said balanceable member to create a control signal the changes in magnitude of which reflect changes in the state of balance of said balanceable member; force-producing means comprising a rotating member arranged to produce a centrifugal force and actuated by said control signal to develop and apply to said balanceable member a rebalance force proportional to said centrifugal force, said rebalance force maintaining said balanceable member essentially stationary, whereby the speed of rotation of said member changes with said differential pressure and also said secondary condition; and output means indicating the number of revolutions of said rotating member.

13. Apparatus for totalizing the amount of gas flowing through a pipe comprising a force balanceable member, a restraining member, a fluxure connecting said balanceable member and said restraining member, means for applying a first force to said balanceable member in a first direction and with a magnitude proportional to the differential pressure across a restriction in said pipe, means for deflecting angularly said restraining means about said flexure a small amount substantially proportional to the static pressure in said pipe, rebalancing means for applying a second force in a second direction to said balanceable member whereby said member is retained in substantially fixed position, said rebalancing means including sensing means responsive to deflection of said balanceable member and producing a control signal, rotating means eccentrically disposed about its axis of rotation and under the control of said control signal, means for applying said second force to said balanceable member proportional to the radial force generated by said rotating means, and means providing a measure of the number of revolutions of said rotating means.

References Cited

UNITED STATES PATENTS 2,736,199   2/1956   Ibbott.
2,930,231   3/1960   Bowditch _____ 73—206

OTHER REFERENCES

"Compensation Practice" from Instruments and Control Systems; August 1959; pp. 1182 to 1189.

RICHARD C. QUEISSER, *Primary Examiner.*

E. D. GILHOOLY, *Assistant Examiner.*